(12) United States Patent
Steibert et al.

(10) Patent No.: US 12,195,244 B2
(45) Date of Patent: Jan. 14, 2025

(54) BOX CASING, A KIT FOR CREATING SUCH A BOX CASING, AND USE THEREOF

(71) Applicant: NEFAB AB, Jönköping (SE)

(72) Inventors: Mattias Steibert, Ekolsund (SE); David Nowak, Hasselt (BE); Andreas Pihl, Hong Kong (CN); Paulina Parra, Jalisco (MX); Derek Lam, Oakland, CA (US)

(73) Assignee: NEFAB AB, Jönköping (SE)

( * ) Notice: Subject to any disclaimer, the term of this patent is extended or adjusted under 35 U.S.C. 154(b) by 198 days.

(21) Appl. No.: 17/915,246

(22) PCT Filed: Apr. 1, 2020

(86) PCT No.: PCT/SE2020/050340
§ 371 (c)(1),
(2) Date: Sep. 28, 2022

(87) PCT Pub. No.: WO2021/201734
PCT Pub. Date: Oct. 7, 2021

(65) Prior Publication Data
US 2023/0128021 A1   Apr. 27, 2023

(51) Int. Cl.
*B65D 5/32*   (2006.01)
*B65D 5/44*   (2006.01)

(52) U.S. Cl.
CPC ............. *B65D 5/324* (2013.01); *B65D 5/321* (2013.01); *B65D 5/445* (2013.01)

(58) Field of Classification Search
CPC .................. B65D 5/006; B65D 5/0075; B65D 5/445–446; B65D 5/32; B65D 5/321;
(Continued)

(56) References Cited

U.S. PATENT DOCUMENTS 2,910,221 A * 10/1959 Whiton .................. B65D 5/445
229/199
3,368,736 A * 2/1968 McKellick ............. B65D 5/445
229/199
(Continued)

FOREIGN PATENT DOCUMENTS

EP     0020171 A1    12/1980
EP     2733081 A1 *  5/2014  ............. B65D 5/445
(Continued)

*Primary Examiner* — Nathan J Newhouse
*Assistant Examiner* — Phillip D Schmidt
(74) *Attorney, Agent, or Firm* — Dilworth & Barrese, LLP

(57) ABSTRACT

The invention relates to a box casing (1), such as a transport box, for shipment and/or storing of goods, which is cost-effective to produce and easy to assemble while at the same time having a considerable strength. The box casing comprises a tray-like bottom member (2) and two wall members (7, 8), each having three interconnected casing walls (9, 10a-b, 13, 14a-b). The wall members are foldable to a position standing in the bottom member and to a substantially flat state to be placed lying on the bottom member, for transferring the box casing between an assembled and a collapsed state. Each wall member comprises corner elements (15) configured to hold the casing walls in place by a resilient function. The invention also relates to a kit for creating such a box casing, as well as use thereof.

19 Claims, 5 Drawing Sheets

(58) Field of Classification Search
CPC . B65D 5/324; B65D 9/14; B65D 7/26; B65D 11/1866; B65D 11/188; B65D 11/1886; B65D 11/1893; B65D 2519/00273; B65D 2519/00293; B65D 2519/00323; B65D 2519/00502; B65D 2519/00547; B65D 2519/00606; Y10S 229/918; Y10S 229/939
USPC ... 229/122.21, 122.27, 199–199.1, 917–919, 229/117.02; 206/586, 600; 220/4.28, 220/4.29, 6; 217/16, 48
See application file for complete search history.

(56) References Cited

U.S. PATENT DOCUMENTS

| | | | |
|---|---|---|---|
| 3,696,988 A | | 10/1972 | Nederveld |
| 4,139,146 A | * | 2/1979 | Bamburg .................. B65D 5/28 229/119 |
| 2022/0033175 A1 | * | 2/2022 | Carman .................. B65D 5/324 |

FOREIGN PATENT DOCUMENTS

| | | | | |
|---|---|---|---|---|
| WO | WO-2007058613 A1 | * | 5/2007 | ......... B65D 11/1833 |
| WO | 2015/024084 A1 | | 2/2015 | |
| WO | 2019/160455 A1 | | 8/2019 | |

* cited by examiner

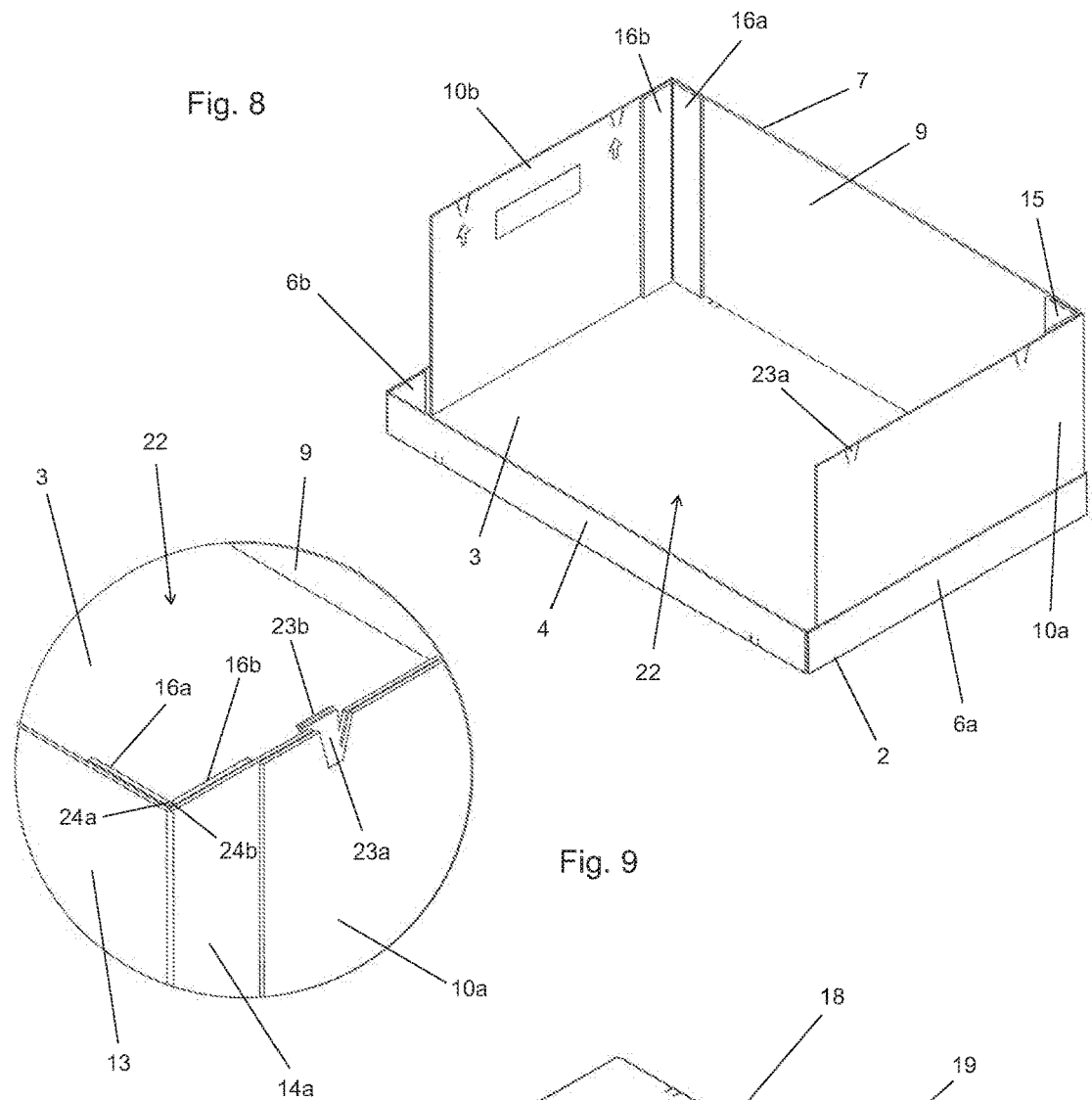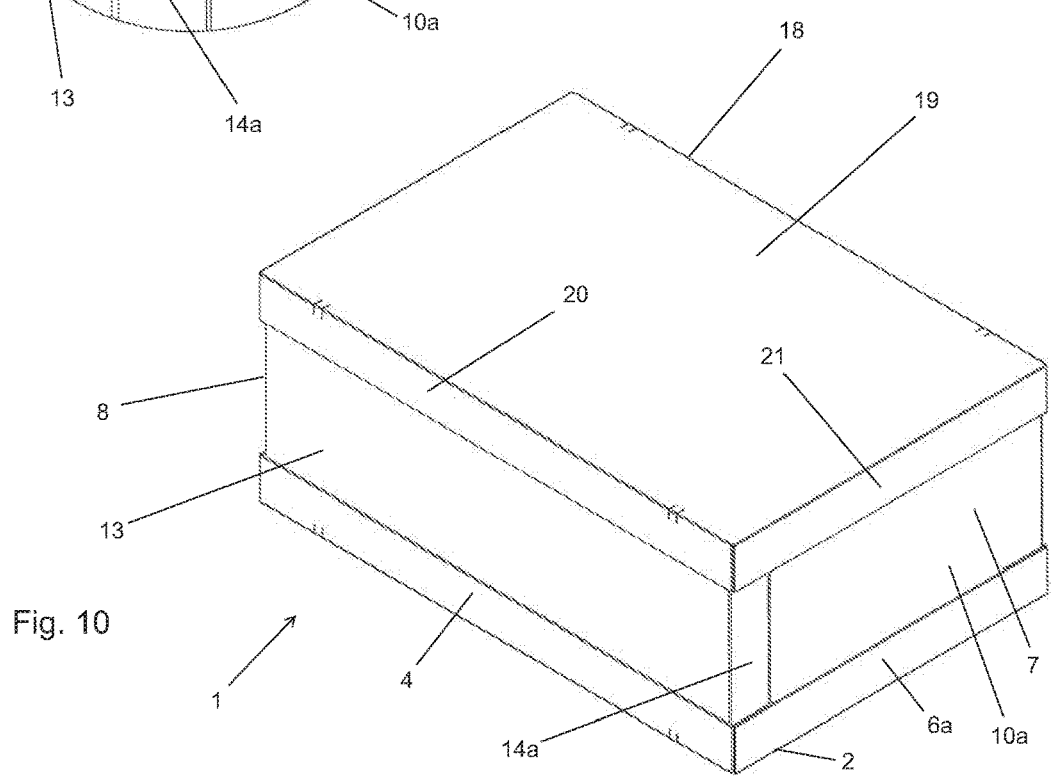

BOX CASING, A KIT FOR CREATING SUCH A BOX CASING, AND USE THEREOF

TECHNICAL FIELD OF THE INVENTION

The present invention relates to a box casing according to the description herein; and The invention relates especially to such a box casing which is intended to be used within the field of commercial logistics, such as a box, pallet collar or similar construction to be used for storing goods in a warehouse, for transport of components from a subcontractor to a manufacturer or for transport of end products from a manufacturer to a store.

BACKGROUND ART

A conventional box casing of this type is for instance a regular transport box made of corrugated board, which consists of four lateral walls, a bottom and a lid. Important characteristics of such box casings are for instance low production costs, low weight, and good wear resistance, recyclability and stacking ability.

Regular corrugated board boxes of this type are produced to a low cost, has low weight and are easy to recycle. However, these are not suited for containing heavy loads or for being stacked on top of each other. They also have bad wear resistance which makes them risky to use for transporting expensive and fragile goods. Heavy, fragile or expensive goods are therefore often transported in wooden or plastic boxes. However, these are much more expensive to produce and has a significant weight making them difficult to handle and resulting in higher fuel costs during transport.

A solution for increasing the wear resistance and stacking ability of regular corrugated board boxes is presented in the document U.S. Pat. No. 3,368,736, which discloses a box casing of the type defined in the introduction already known. This solution consists of simply providing each corner of a corrugated board box with a reinforcing corner element, which are secured to the lateral walls of the box by staples or adhesive, on the outside (FIG. 5) or inside (FIG. 3) of the box. The drawbacks of such a box are for instance that it is difficult to bring it back to a collapsed state, once assembled, without damaging it, and that the assembly time of the box is quite high.

There is a constant strive for improving box casings of this type, for instance with respect to the characteristics mentioned above, due to the ever increasing need for transportation of goods and the fact that logistics becomes an ever more important part of the value chain of a product.

SUMMARY OF THE INVENTION

The object of the present invention is to provide a box casing of the type defined in the introduction being improved in at least some aspect with respect to such box casings already known, for example through said document.

This object is according to the invention obtained by providing such a box casing which has the features herein.

The simple structure of the box casing makes it easy and cost efficient to produce, and the urging function of the corner elements on the lateral casing walls of the wall members enables easy assembling of the box casing, in short time, with no need of any tools, fastening means or the like. At the same time, this design has been found providing an unexpectedly strong box casing, given its uncomplicated structure.

According to an embodiment of the invention an angle formed between the plate-like parts of each corner element of the first and second wall members is substantially 90° or 90° in the assembled state of the box casing, and more than 90°, preferably more than 100°, more preferred more than 120°, even more preferred more than 150° in a rest state of the flexible portion of the corner element.

According to an embodiment of the invention the corner elements of the first and second wall members have one first of the plate-like parts thereof secured on one of the rear casing wall, and first and second lateral casing walls of the first wall member, and one of the front casing wall, and first and second lateral casing walls of the second wall member, respectively, and the other, second plate-like part projecting freely away from, preferably substantially in parallel or in parallel with, the first plate-like part in a rest state of the flexible portion of the corner element, and each second plate-like part is configured to be moved by the lateral casing wall, or front or rear casing wall, adjacent thereto while storing potential energy in the flexible portion connected thereto to obtain the assembled state of the box casing with the respective second plate-like part extending substantially perpendicularly or perpendicularly to the first plate-like part connected thereto. This structure provides a foldability of the wall members making them easy to fold between the assembled and collapsed states, without applying tension in the corner elements in the collapsed state, which could damage them. Hence, the inventive foldability of the wall members implies a box casing which is easy to assemble and disassemble, and at the same time being advantageous for the life-span of the box casing.

According to an embodiment of the invention said first plate-like parts of the corner elements of the first and second wall members are secured on the rear casing wall and the front casing wall, respectively. This structure provides a foldability of the wall members enabling a favourable folding thereof and thereby of the box casing to the collapsed state.

According to an embodiment of the invention the lateral casing walls of each of the first and second wall members are configured to be pivotally folded away from each other and towards an outer surface of the rear and front casing wall, respectively, and to extend overlapping each other close to and in a plane extending substantially in parallel, such as forming an angle of less than 10° with said outer surface in the collapsed state of the box casing. This foldability of the wall members implies a box casing which may be made very thin in the collapsed state, so as to be cost-efficient to transport.

According to an embodiment of the invention the first lateral casing walls of the first and second wall members, and the second lateral casing walls of the first and second wall members, respectively, are configured to overlap each other over at least 50% of the longitudinal extension of each lateral casing wall, in the assembled state of the box casing. This structure creates a strong box casing with simple means. Hence, a strong yet cost-efficient box casing is provided.

According to an embodiment of the invention the box casing further comprises:
  a top member having a rectangular top surface and further provided with a frame structure enclosing the top surface on each side thereof by vertical front, rear, and first and second lateral frame walls at front, rear, and first and second lateral edges of the top member, respectively, so as to provide the top member with a tray-like shape, the top member being configured to close a loading space of the box casing, defined by the loading surface of the bottom member and the casing walls of the first and second wall members, by the top surface with the frame walls extending down past upper edges of the casing walls along the outside thereof in the assembled state of the box casing.

Such a top member further strengthens the box casing in the assembled state, and also serves to protect the goods transported or stored therein.

According to an embodiment of the invention the first lateral casing wall of the first wall member is provided with locking means configured to engage with associated locking means on the first lateral casing wall of the second wall member so as to fixedly interlock the first lateral casing walls in the assembled state of the box casing, and the second lateral casing wall of the first wall member is provided with locking means configured to engage with associated locking means on the second lateral casing wall of the second wall member so as to fixedly interlock the second lateral casing walls in the assembled state of the box casing. This interlocking of the lateral casing walls increases the strength and stability of the box casing in the assembled state.

According to an embodiment of the invention the locking means of the first and second lateral casing walls comprise pre-cut tabs provided on each lateral casing wall, in the upper region thereof, on locations such that at least one tab on the first lateral casing wall of the first wall member is aligned with at least one tab on the first lateral casing wall of the second wall member, and at least one tab on the second lateral casing wall of the first wall member is aligned with at least one tab on the second lateral casing wall of the second wall member in the assembled state of the box casing, the at least one tab on the first lateral casing wall of the first wall member is configured to be folded together with the associated tab on the first lateral casing wall of the second wall member into a loading space of the box casing so as to engage with an opening created in the first lateral casing wall of the second wall member by folding of the at least one tab on this lateral casing wall away therefrom and thereby fixedly interlock the first lateral casing walls in the assembled state of the box casing, and the at least one tab on the second lateral casing wall of the second wall member is configured to be folded together with the associated tab on the second lateral casing wall of the first wall member into the loading space of the box casing so as to engage with an opening created in the second lateral casing wall of the first wall member by folding of the at least one tab on this lateral casing wall away therefrom and thereby fixedly interlock the second lateral casing walls in the assembled state of the box casing. In this way, a locking mechanism which is cost-effective to produce and easy to operate is provided.

According to an embodiment of the invention the bottom member has a base surface corresponding to the upper loading surface of a pallet with standard dimensions as defined by EUR, ISO or GMA.

According to another embodiment of the invention the box casing is made exclusively of biodegradable material(s). A box casing according to the invention may due to its structure be made without any metal fastening means, such as nails or stapler pins, plastic components or harsh chemicals, making it very environmentally friendly, as it may be recycled as paper, and eliminating the risk of personal injury due to unhealthy substances.

According to an embodiment of the invention the stiff plate-like parts of each corner element are made of a straw board material. Such a material is due to its strength, durability and moisture resistance very suitable for forming the stiff plate-like parts. Furthermore, it is environmentally friendly and is possible to recycle as paper, which is a common main material for box casings of this type.

According to an embodiment of the invention each casing wall and the bottom member are made of corrugated board.

According to another embodiment of the invention the box casing has a load volume of at least 50 litres, at least 100 litres, at least 250 litres, at least 500 litres, preferably at least 1000 litres.

The invention also relates to a kit for creating a box casing according to the invention as well as use of such a box casing according to the appended claims thereof.

Further advantages as well as advantageous features of the invention will appear from the following description of an embodiment of the invention.

BRIEF DESCRIPTION OF THE DRAWINGS

With reference to the appended drawings, below follows a specific description of an embodiment of the invention cited as an example.

In the drawings:

FIG. 8 is a view showing a third step of said assembly method, FIG. 9 is an enlarged perspective view from above showing an upper corner of the box casing of FIG. 1 in the assembled state, without the top member, and FIG. 10 is a perspective view from above of the box casing of FIG. 1 in the assembled state.

DETAILED DESCRIPTION OF AN EMBODIMENT OF THE INVENTION

Figure 1:
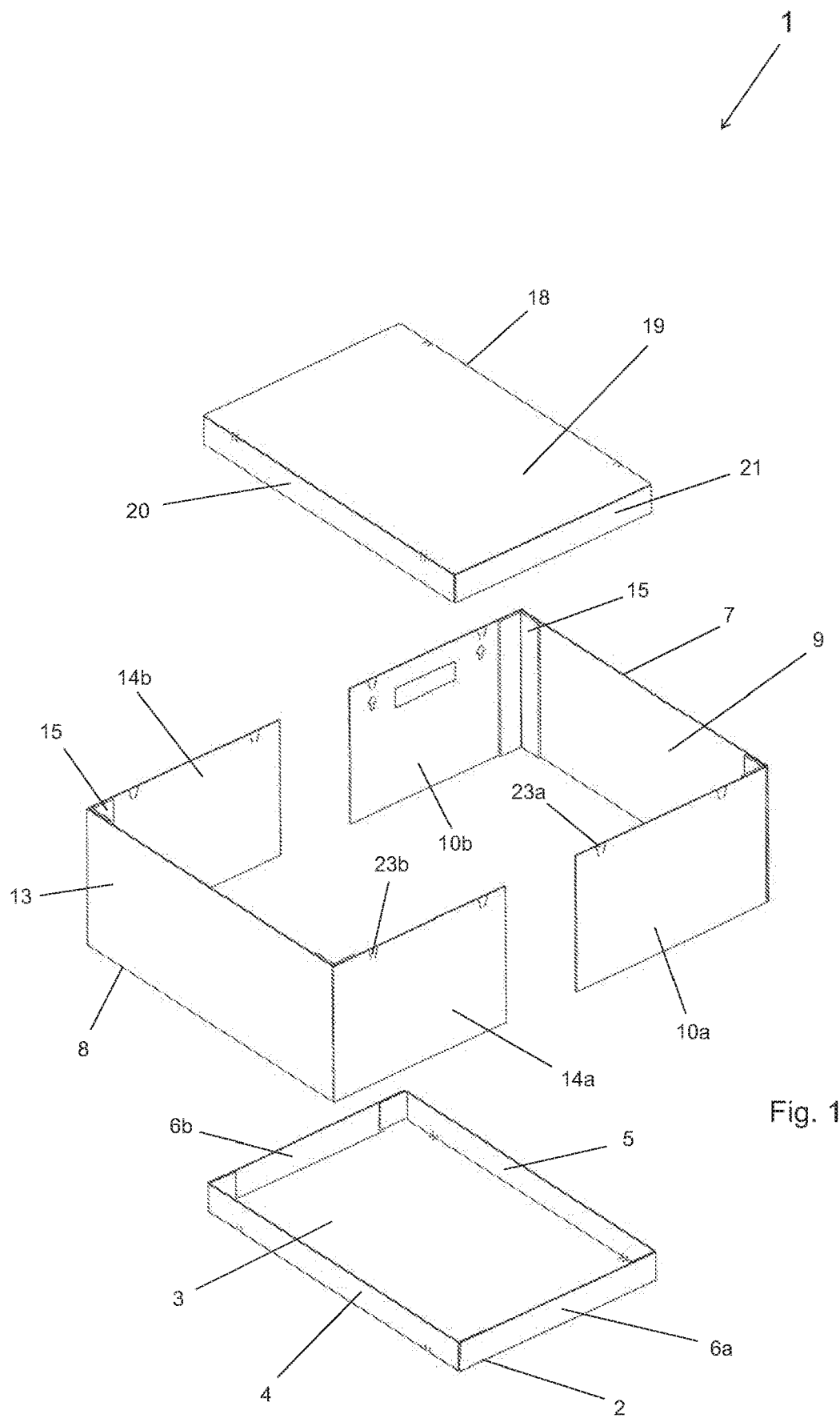
FIG. 1 is an exploded perspective view from above of a box casing according to an embodiment of the invention.

A box casing 1 according to an embodiment of the invention is illustrated in the appended FIGS. 1-10 and will now be described while at the same time making reference to all these figures.

The box casing 1 is a right-angled parallelepipedic transport box intended to be used within the field of commercial logistics, such as for storing of goods in a warehouse, for transport of components between different parties in a production chain or for transport of products from a manufacturer to a store. Such box casings as intended have a load volume of at least 50 litres, but most commonly between 1000 and 2000 litres, and are typically used on a pallet. Therefore, a box casing 1 according to the invention preferably has a base surface corresponding to the upper loading surface of a pallet with standard dimensions as defined by EUR, ISO or GMA.

The box casing 1 comprises a bottom member 2 having a rectangular loading surface 3 configured to form a bottom of the box casing in an assembled state thereof. The bottom member is further provided with a frame structure enclosing the loading surface 3 on each side thereof by vertical front 4, rear 5, and first 6a and second 6b lateral frame walls at front, rear, and first and second lateral edges of the bottom member 2, respectively, so as to provide the bottom member with a tray-like shape. The bottom member is formed by a single piece of corrugated board being folded.

The box casing 1 further comprises two separate wall members, namely a first wall member 7 and a second wall member 8. The first wall member 7 comprises a rear casing wall 9 configured to rest by a lower end on the loading surface 3 of the bottom member 2 (see FIG. 8) on the inside of the rear frame wall 5 and extend along the rear frame wall in the assembled state of the box casing 1. The first wall member 7 further comprises a first 10*a* and a second 10*b* lateral casing wall hingedly connected at a rear end 11*a-b* to first 12*a* and second 12*b* outer ends of the rear casing wall 9, respectively. The first and second lateral casing walls of the first wall member 7 are configured to rest by a lower end on the loading surface 3 of the bottom member 2 on the inside of the first 6*a* and second 6*b* lateral frame wall, respectively, and to extend therealong in the assembled state of the box casing 1.

All three casing walls 9, 10*a-b* of the first wall member are made of corrugated board and the hinge connections between the rear casing wall 9 and the first lateral casing wall 10*a*, and between the rear casing wall and the second lateral casing wall 10*b*, are provided by portions of a single thin flexible paper sheet, such as kraft paper, arranged on the outside and/or the inside of all these walls so as to connect them with each other. Accordingly, the rear ends 11*a-b* of the lateral casing walls 10*a-b* are arranged at the paper sheet at a distance to the first 12*a* and second 12*b* outer ends of the rear casing wall 9, respectively, so that the portions of the paper sheet located therebetween function as a hinge between said ends along the longitudinal (vertical) extensions thereof.

The first wall member 7 is thus configured to stand in the tray-like bottom member 2 (see FIG. 8) in the assembled state of the box casing 1 with an angle formed between the rear casing wall 9 and the first lateral casing wall 10*a*, and between the rear casing wall 9 and the second lateral casing wall 10*b*, respectively, being substantially 90° or 90° so that each adjacent pair of these walls form a right-angled inner corner of the assembled box casing.

Figure 3:
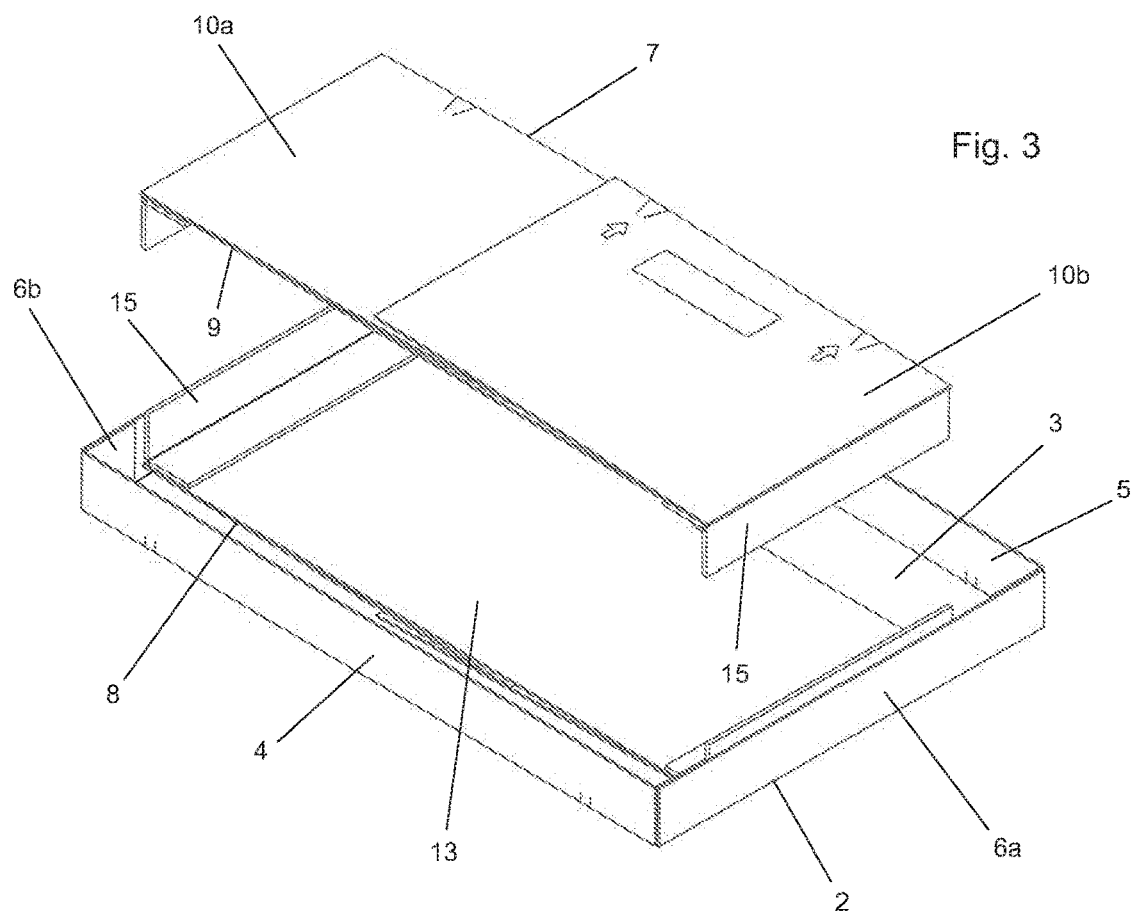
FIG. 3 is a view showing a first step of a method of assembling the box casing of FIG. 1, starting from the collapsed state as shown in FIG. 2, FIGS. 4-7 are views showing a second step of said assembly method.
Figure 4:
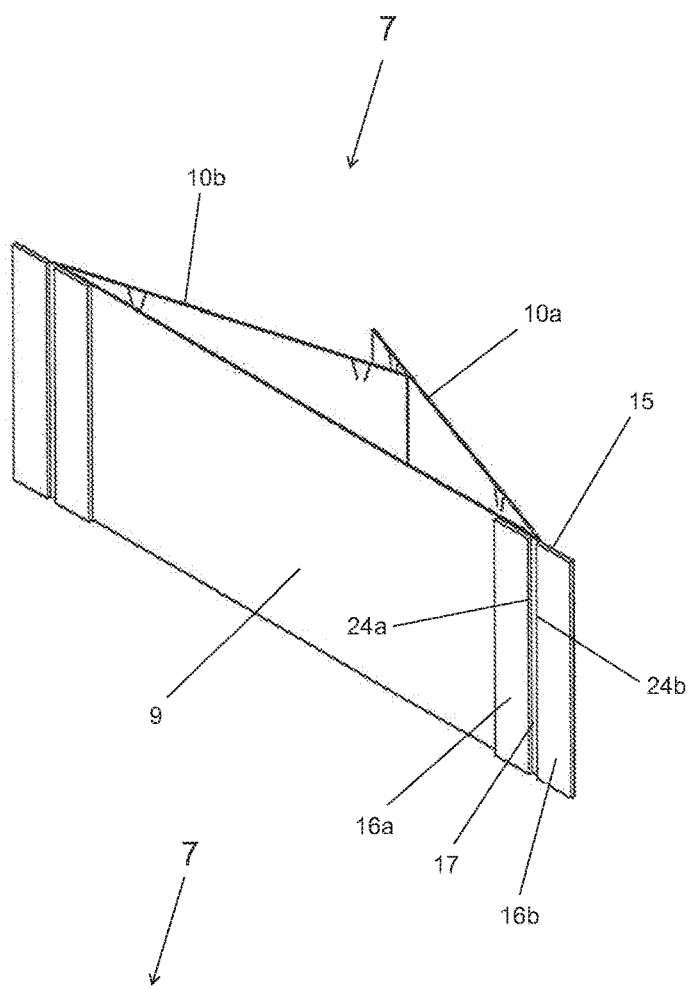
Figure 5:
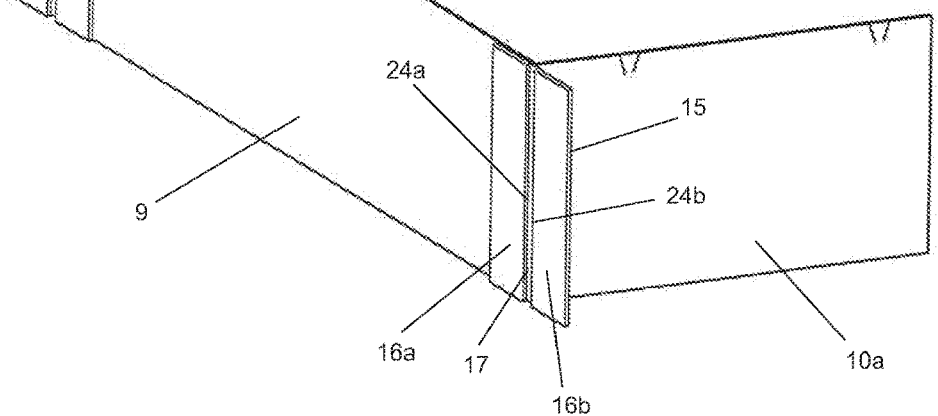

The first 10*a* and second 10*b* lateral casing walls of the first wall member 7 are configured to be foldable to a position overlapping the rear casing wall 9 in a collapsed state of the box casing, by pivotally folding (see FIGS. 7-4) the first and second lateral casing walls away from each other and towards an outer surface of the rear casing wall 9, to extend overlapping each other close to and in a plane extending substantially in parallel, such as forming an angle of less than 10° with said outer surface of the rear casing wall in the collapsed state of the box casing 1 (see FIG. 3). Hence, the first wall member 7 may be made substantially flat in the collapsed state.

The second wall member 8 has a structure corresponding to that of the first wall member 7, and is arranged in the same way in the bottom member 2 but opposite (i.e. mirrored) to the first wall member in the assembled state of the box casing 1. The second wall member 8 comprises a front casing wall 13 configured to rest by a lower end on the loading surface 3 of the bottom member 2 on the inside of the front frame wall 4 and extend along the front frame wall in the assembled state of the box casing 1. The second wall member 8 further comprises a first 14*a* and a second 14*b* lateral casing wall hingedly connected at a front end to first and second outer ends of the front casing wall 13, respectively. The first and second lateral casing walls of the second wall member 8 are configured to rest by a lower end on the loading surface 3 of the bottom member 2 on the inside of the first 6*a* and second 6*b* lateral frame wall, respectively, and to extend therealong in the assembled state of the box casing 1.

Each lateral casing wall of the first 7 and second 8 wall members have a (horizontal) length which is greater than 50% of the length of the lateral frame walls 6*a-b* of the bottom member 2, such as 80% or 90% of the length of the lateral frame walls, making the first lateral casing walls 10*a*, 14*a* of the first and second wall members overlapping each other, over more than 50% of the length, i.e. longitudinal extension, of each first lateral casing wall, and the second lateral casing walls 10*b*, 14*b* of the first and second wall members overlapping each other, over more than 50% of the length, i.e. longitudinal extension, of each second lateral casing wall in the assembled state of the box casing.

This means that the first lateral casing wall 10*a* of the first wall member 7 is positioned between the first lateral frame wall 6*a* and the first lateral casing wall 14*a* of the second wall member 8 in the assembled state, so as to provide a first lateral wall of the assembled box casing 1 with a double-walled structure along a great part of its length. The same applies to the second lateral casing walls 10*b*, 14*b*, of which the second lateral casing wall 14*b* of the second wall member 8 is positioned between the second lateral frame wall 6*b* and the second lateral casing wall 10*b* of the first wall member 7 in the assembled state, so as to provide a second lateral wall of the assembled box casing 1 with a double-walled structure along a great part of its length. The lateral casing walls 10*a-b*, 14*a-b* could also be arranged the other way around, i.e. with the first lateral casing wall 14*a* of the second wall member 8 positioned closest to the first lateral frame wall 6*a*, and the second lateral casing wall 10*b* of the first wall member 7 positioned closest to the second lateral frame wall 6*b*.

Just like on the first wall member 7, the casing walls 13, 14*a-b* of the second wall member 8 are made of corrugated board and attached to a single thin flexible paper sheet functioning as hinges between these casing walls, i.e. making them pivotally foldable in relation to each other. Like the first wall member 7, the second wall member 8 stands in the tray-like bottom member 2 in the assembled state of the box casing 1 while forming two right-angled inner corners of the assembled box casing, and the second wall member 8 is foldable to the substantially flat state in the same manner as the first wall member 7.

Each of the first and second wall members 7, 8 further comprises, for each inner corner of the box casing 1 in the assembled state defined by two adjacent casing walls 9, 10*a-b*, 13, 14*a-b* of the same wall member, a corner element 15 having two stiff plate-like parts 16*a-b* of a straw board material, hingedly interconnected by a flexible portion 17. Each plate-like part is configured to be arranged internally of a separate one of two adjacent casing walls 9, 10*a-b*, 13, 14*a-b* while extending along the corner from a bottom region to a top region of the wall in the assembled state of the box casing 1. Accordingly, the two corners of the assembled box casing provided by the first wall member 7, namely by the first lateral casing wall 10*a* and the rear casing wall 9, and by the second lateral casing wall 10*b* and the rear casing wall 9, as well as the two corners of the assembled box casing provided by the second wall member 8, namely by the first lateral casing wall 14*a* and the front casing wall 13, and by the second lateral casing wall 14*b* and the front casing wall 13, are all provided with corner elements 15.

A straw board material is made mainly of straw glued together by straw lignin under heat and pressure. A board made of this material has corresponding bending strength and moisture resistance as a poplar plywood board, but may be recycled as paper. Hence, the straw board material contained in the corner elements 15 is excellent for providing a box casing 1 with sufficient strength while at the same time being environmentally friendly.

The flexible portion 17 of each corner element 15 is formed by a central portion of a sheet of paper, at which the plate-like parts 16a-b of the respective corner elements are attached by adhesive, with opposing longitudinal edges 24a-b of the plate-like parts arranged at a distance to each other so as to define the flexible portion 17 therebetween. The distance between the opposing edges 24a-b of the plate-like parts is chosen so as to not allow the plate-like parts to be moved towards each other to a position in which they form a right angle with each other without applying tension and/or pressure in the flexible portion 17, i.e. portion of the sheet of paper, between them. Accordingly, the corner elements 15 are configured to store potential energy in the flexible portions when the corner elements are folded from a rest state, in which an angle formed between the plate-like parts 16a-b thereof is more than 90°, preferably more than 100°, towards a state of use (in the assembled state of the box casing) in which said angle is substantially 90° or 90° by the flexible portions being tensioned and/or pressed between the opposing edges 24a-b of the plate-like parts.

Each corner element 15 is thus in the assembled state of the box casing 1 configured to urge, by the potential energy stored in the flexible portions, the plate-like parts thereof away from each other (towards the rest state) and thereby the associated lateral casing wall 10a-b, 15a-b, towards the adjacent lateral frame wall 6a-b of the bottom member 2. The corner elements 15 are in this way configured to hold the wall members 7, 8 in place in the assembled state of the box casing 1, which means the box casing may be retained in an erect assembled state even without any separate fastening means.

The flexible portion 17 of each corner element 15 may also be formed by a quite hard but bendable paper-based material, a very thin straw board layer or any other material suitable for providing this portion with an inherent distinct resilient function. In this way, or by means of further parts, such as resilient blocks arranged on the paper sheet of the flexible portions 17 between the plate-like parts 16a-b so as to be compressed by them by folding of the corner element towards the state of use, the corner elements 15 may be configured to have the angle formed between the plate-like parts thereof being more than 120°, more than 150°, or about 180° in the rest state of the flexible portions.

The corner elements 15 of the first 7 and second 8 wall members have a first 16a of the plate-like parts thereof secured, by adhesive, on the rear casing wall 9 and the front casing wall 13, respectively, and the other, second plate-like part 16b projecting freely away from the first plate-like part 16a in the rest state of the flexible portion 17 of the corner element 15, in a specific direction depending on the angle between the plate-like parts in the rest state, for instance substantially in parallel or in parallel with the first plate-like part 16a in the case of an angle between the plate-like parts 16a-b of 180° in the rest state.

Figure 7:
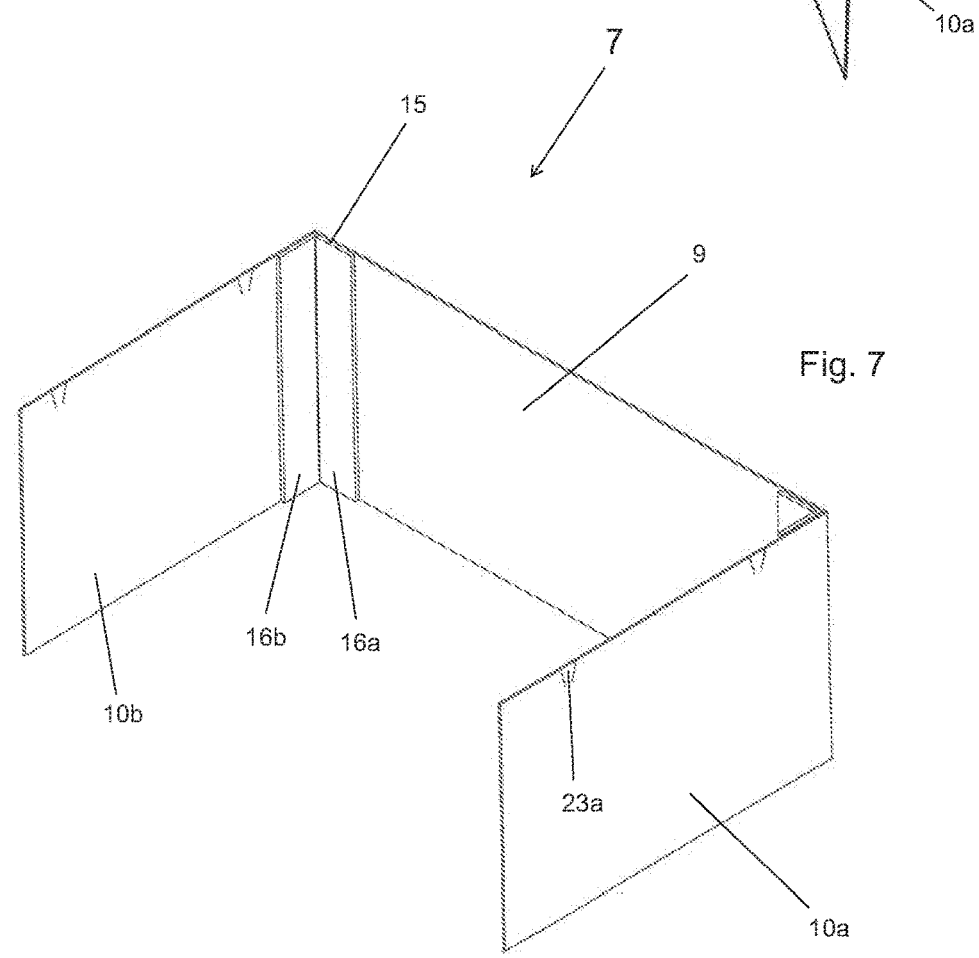

During assembly of the box casing 1, each second plate-like part 16b is configured to be moved by the associated lateral casing wall 10a-b, 14a-b while storing potential energy in the flexible portion 17 connected thereto to obtain the assembled state of the box casing, in which the respective second plate-like part 16b extends substantially perpendicularly or perpendicularly to the first plate-like part 16a connected thereto (see FIGS. 7-8). Said first plate-like parts could however also be secured on the lateral casing walls 10a-b, 14a-b of the first 7 and second 8 wall members, and the other, second plate-like parts not secured to the front 13 and rear 9 casing walls, but configured to be in separable abutment therewith in the assembled state of the box casing 1.

The box casing 1 further comprises a top member 18 which has exactly the same structure as the bottom member 2, but is intended to be turned upside down in relation to the bottom member to function as a lid for the box casing in the assembled state. The top member 18 has a rectangular top surface 19 and is further provided with a frame structure enclosing the top surface on each side thereof by vertical front 20, rear, and first 21 and second lateral frame walls at front, rear, and first and second lateral edges of the top member, respectively, so as to provide the top member with a tray-like shape. The top member 18 is configured to close a loading space 22 of the box casing 1, defined by the loading surface 3 of the bottom member 2 and the casing walls 9, 10a-b, 13, 14a-b of the first 7 and second 8 wall members, by the top surface 19 with the frame walls 20, 21 extending down past upper edges of the casing walls along the outside thereof in the assembled state of the box casing (see FIG. 10). The box casing 1 according to the present invention could however be provided with or without such a top member 18, depending on the use thereof.

The box casing 1 is further provided with locking means configured to interlock each pair of first lateral casing walls 10a, 14a, and second lateral casing walls 10b, 14b of the first 7 and second 8 wall members in the assembled state of the box casing. The locking means comprise, on each lateral casing wall, pre-cut tabs 23a-b provided in the upper region thereof. More specifically, two crease lines are cut from the upper edge of the lateral casing walls, 10a-b, 14a-b so as to define lateral ends of a said tab, which is joined in one piece to the large part of the respective lateral casing wall by its bottom end. The tabs 23a-b are provided on locations such that at least one tab 23a on the first lateral casing wall 10a of the first wall member 7 is aligned with at least one tab 23b on the first lateral casing wall 14a of the second wall member 8 in the assembled state of the box casing 1.

For interlocking the first lateral casing walls 10a, 14a in the assembled state of the box casing 1, the at least one tab 23a on the first lateral casing wall 10a of the first wall member 7 is folded by gripping it together with the associated tab 23b on the first lateral casing wall 14a of the second wall member 8 and pushing them into the loading space 22 of the box casing 1. The tab 23a on the first lateral casing wall will then enter into and engage with an opening created in the first lateral casing wall 14a of the second wall member 8 by folding of the tab 23b on this lateral casing wall away therefrom (i.e. in which opening the tab 23b was housed prior to the folding) and thereby fixedly interlock the first lateral casing walls 10a, 14a (see FIG. 9). The second lateral casing walls 10b, 14b are provided with corresponding tabs, which are used to interlock these lateral casing walls in the same way as described. This lock mechanism serves to assist the corner elements 15 in holding the casing walls 9, 10a-b, 13, 14a-b in place in the assembled state of the box casing.

The adhesive used for securing different parts of the box casing to each other, such as for securing the plate-like parts 16a-b of the corner elements 15 to the sheet of paper forming the flexible portions 17 thereof, and the first plate-like parts 16a of the corner elements 15 to the front 13 and rear 9 casing walls, is an adhesive suitable to be recycled with paper and which contains no toxins or harsh chemicals. Such an adhesive may be based on corn starch, as one example.

Now, a method of assembling a box casing 1 before use thereof is to be described, with reference especially to the FIGS. 2-10.

Figure 2:
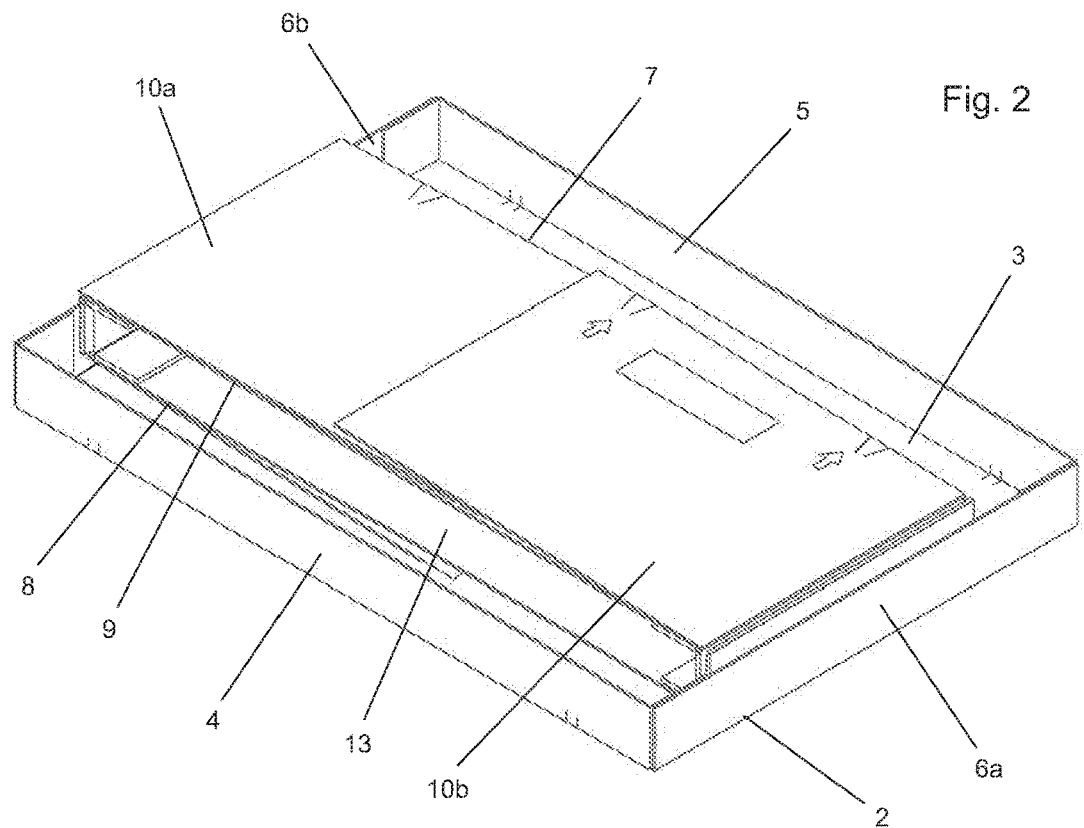
FIG. 2 is a perspective view from above of the box casing of FIG. 1, without the top member, in the collapsed state.

The box casing 1 is intended to be delivered to a customer as a kit for creating a box casing, comprising the bottom member 2, and the first 7 and second 8 wall members in the collapsed state lying on top of each other on the loading surface 3 of the bottom member and inside of the frame walls 4, 5, 6*a-b* thereof. Such a kit is shown in FIG. 2. The kit may however also comprise a top member 18 lying on top of the bottom member so as to together with this form a thin box-like package.

To assemble the box casing 1, i.e. bring it to the assembled state, the first wall member 7 is firstly picked up from the bottom member 2 to be unfolded (see FIG. 3).

The lateral casing walls 10*a-b* of the first wall member 7 are pulled away from the outer surface of the rear casing wall 9 (see FIG. 4) and each pivotally folded, about 270°, around the respective hinge connection with the rear casing wall (see FIGS. 5-6) to a position in which each of the lateral casing walls 10*a-b* extends perpendicularly away from the rear casing wall 9 (see FIG. 7).

Figure 6:
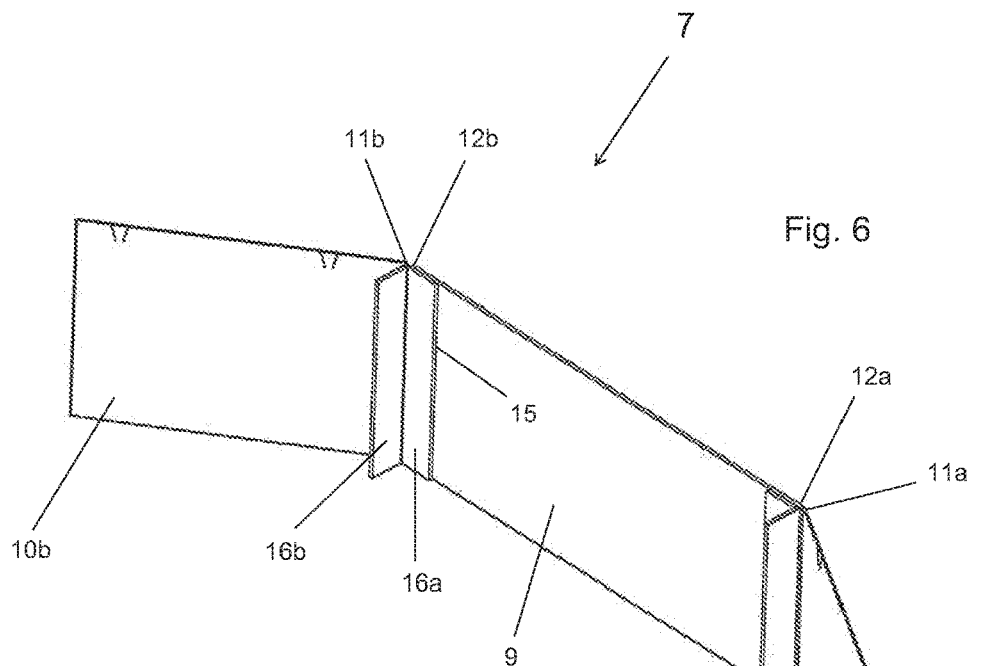

When the lateral casing walls 10*a-b* move past the point in which the plate-like parts 16*a-b* are located in the rest state of the flexible portions 17 (in the example shown—on an imaginary plane extending in parallel with the rear casing wall 9) they come into contact with the stiff plate-like parts 16*b* projecting freely from the outer ends of the rear casing wall (see FIG. 5), and push these in front of the lateral casing walls while storing potential energy in the flexible portions 17 connected to these plate-like parts 16*b*. FIG. 6 is a bit misleading in this regard, is it shows these plate-like parts 16*b* extending perpendicularly away from the rear casing wall 9, while in reality they will be in contact with the respective lateral casing walls 10*a-b* and be moved by them in this stage.

The same procedure is then performed with the second wall member 8. Thereafter, the bottom member 2 is typically placed on a pallet, the first wall member 7 is placed in the bottom member (see FIG. 8) and automatically secured therein by the corner elements 15 urging the lateral casing walls 10*a-b* against the respective lateral frame walls 6*a-b* of the bottom member. Now, the loading space 22 of the box casing 1 with its open front end may easily be loaded with goods, whereafter the second wall member 8 is placed in the bottom member 2 opposite to the first wall member 7.

Then, the lateral casing walls 10*a-b*, 14*a-b* overlapping each other are interlocked by the pre-cut tabs 23*a-b* and finally, the top member is placed over the casing walls 9, 10*a-b*, 13, 14*a-b* to close the loading space 22 and the box casing 1 is in the assembled state ready for transport. Optionally, the box casing may further be provided with separate fastening means, such as straps provided there around, for further safety.

Needless to say, a method of disassembling an empty box casing 1 to for instance be stored or sent back to a logistics provider after use, is performed in the same way, but backwards, i.e. from FIG. 10 to FIG. 2.

Hence, the box casing 1 according to the present invention is cost-effective to produce thanks to its simple structure, while at the same time having an excellent strength compared to box casings in the same price range. This is achieved especially by the strengthening corner elements 15 in combination with the double-walled structure of the lateral walls of the box casing in the assembled state.

The foldability of the wall members 7, 8, facilitated by the design and arrangement of the corner elements 15, allows the box casing to be folded to a very thin package requiring little space in the collapsed state, which is favourable for the transport costs and also for the environment. Easy assembly and disassembly of the box casing 1 is facilitated by the simple structure thereof and the resilient characteristics of the flexible portions 17 of the corner elements 15 providing these with an automatically wall retaining function. Thus, no separate fastening means or tools are needed for assembling the box casing. The structure of the box casing, with two separate wall members 7, 8, is further advantageous for the loading and unloading of goods, as the box casing may be loaded/unloaded with an open front (as seen in FIG. 8. Last but not least, the box casing 1 is made exclusively of biodegradable materials that may be recycled as paper, which is both time-saving and environmentally friendly.

The invention is of course not in any way restricted to the embodiment thereof described above, but many possibilities to modifications thereof will be apparent to a person with ordinary skill in the art without departing from the scope of the invention as defined in the appended claims.

The box casing may comprise further reinforcing components than the corner elements described, such as further boards of straw board strengthening the casing walls, or the bottom or top member.

A box casing is in this disclosure to be interpreted as a box of any parallelepipedic shape or a part of such a box defining a space suitable for accommodating objects to be stored or transported in the box casing. Accordingly, a box casing may be constituted by four lateral walls and a bottom member of arbitrary dimensions, and optionally a top member/lid.

The flexible portion of a said corner element is to be considered as being the intermediate part between two said stiff plate-like parts of that corner element, which flexible portion is configured to function as a hinge between said two stiff plate-like parts. The flexible portion may comprise one or more flexible material layers such as sheets of paper or very thin straw board, or a plurality of elongated flexible elements, as a few examples. The flexible portions may also comprise other parts, such as resilient blocks arranged between the plate-like parts of each corner element. Each stiff plate-like part of each corner element may independently have a different shape and appearance than described above and shown in the drawings, such as having the appearance of a grill. It is of course also possible that the plate-like parts are made of another material than straw board, such as wood or a paper based material, although straw board is preferred due to its advantageous properties as described above.

Where it is stated that a component is "connected" to or "interconnected" with another component, this is to be interpreted as that the components are interconnected directly, or indirectly by an intermediate component, such as an edge profile or another connecting element, unless otherwise stated.

A component being "hingedly/pivotally connected" to another component means that there is some type of hinge arrangement directly or indirectly interconnecting these components. Such hinge arrangements may be of any suitable type, unless otherwise stated.

The terms upper, lower, front, rear, horizontal and vertical as are used in this disclosure for defining various components, or parts thereof, are to be interpreted as valid for a box casing placed on a horizontal ground, as shown for instance in FIG. 10. The front of the box casing as shown in FIG. 10 is directed obliquely to the left and obliquely towards the viewer of the drawing.

The invention claimed is:

1. A right-angled parallelepipedic box casing (1) for shipment and/or storing of goods, comprising:
    a bottom member (2) having a rectangular loading surface (3) configured to form a bottom of the box casing (1) in an assembled state thereof and further provided with a frame structure enclosing the loading surface (3) on each side thereof by vertical front (4), rear (5), and first (6a) and second (6b) lateral frame walls at front, rear, and first and second lateral edges of the bottom member (2), respectively, to provide the bottom member (2) with a tray shape,
    a first wall member (7) comprising a rear casing wall (9) configured to rest by a lower end on the loading surface (3) on the inside of the rear frame wall (5) and extend therealong in the assembled state of the box casing (1), and first (10a) and second (10b) lateral casing walls hingedly connected at a rear end (11a-b) to first (12a) and second (12b) outer ends of the rear casing wall (9), respectively, to be configured to rest by a lower end on the loading surface (3) on the inside of the first (6a) and second (6b) lateral frame wall, respectively, and extend therealong in the assembled state of the box casing (1), said first (10a) and second (10b) lateral casing walls of the first wall member (7) being foldable to a position overlapping the rear casing wall (9) in a collapsed state of the box casing (1),
    a second wall member (8) comprising a front casing wall (13) configured to rest by a lower end on the loading surface (3) on the inside of the front frame wall (4) and extend therealong in the assembled state of the box casing (1), and first (14a) and second (14b) lateral casing walls hingedly connected at a front end to first and second outer ends of the front casing wall (13), respectively, to be configured to rest by a lower end on the loading surface (3) on the inside of the first (6a) and second (6b) lateral frame wall, respectively, and extend therealong overlapping the first (10a) and second (10b) lateral casing walls of the first wall member (7) in the assembled state of the box casing (1), said first (14a) and second (14b) lateral casing walls of the second wall member (8) being foldable to a position overlapping the front casing wall (13) in a collapsed state of the box casing (1), wherein
    each of the first (7) and second (8) wall members further comprises, for each inner corner of the box casing (1) in the assembled state defined by two adjacent casing walls (9, 10a-b, 13, 14a-b) of the same wall member (7, 8), a corner element (15) having two stiff plate parts (16a-b) hingedly interconnected by a flexible portion (17), each plate part (16a-b) being in the assembled state of the box casing (1) configured to be arranged internally of a separate one of two adjacent casing walls (9, 10a-b, 13, 14a-b) while extending along the corner from a bottom region to a top region of the wall (9, 10a-b, 13, 14a-b), and
    the corner elements (15) are configured to through said flexible portions (17) thereof store potential energy urging the plate parts (16a-b) away from each other and thereby the lateral casing walls (10a-b, 14a-b) against the frame walls (6a-b) of the bottom member (2) in the assembled state of the box casing (1).

2. A box casing (1) according to claim 1, wherein an angle formed between the plate parts (16a-b) of each corner element (15) of the first (7) and second (8) wall members is substantially 90° in the assembled state of the box casing (1), and more than 90° in a rest state of the flexible portion (17) of the corner element (15).

3. A box casing (1) according to claim 2, wherein the angle formed between the plate parts (16a-b) of each corner element (15) of the first (7) and second (8) wall members is 90° in the assembled state of the box casing (1).

4. A box casing (1) according to claim 2, wherein the angle formed between the plate parts (16a-b) of each corner element (15) of the first (7) and second (8) wall members is more than 100° in the rest state of the flexible portion (17) of the corner element (15).

5. A box casing (1) according to claim 4, wherein the angle formed between the plate parts (16a-b) of each corner element (15) of the first (7) and second (8) wall members is more than 120° in the rest state of the flexible portion (17) of the corner element (15).

6. A box casing (1) according to claim 5, wherein the angle formed between the plate parts (16a-b) of each corner element (15) of the first (7) and second (8) wall members is more than 150° in the rest state of the flexible portion (17) of the corner element (15).

7. A box casing (1) according to claim 1, wherein the corner elements (15) of the first (7) and second (8) wall members have one first (16a) of the plate parts thereof secured on one of the rear casing wall (9), and first (10a) and second (10b) lateral casing walls of the first wall member (7), and one of the front casing wall (13), and first (14a) and second (14b) lateral casing walls of the second wall member (8), respectively, and the other, second (16b) plate part projecting freely away from, preferably substantially in parallel or in parallel with, the first plate part (16a) in a rest state of the flexible portion (17) of the corner element (15), and that each second plate part (16b) is configured to be moved by the lateral casing wall (10a-b, 14a-b), or front (13) or rear (9) casing wall, adjacent thereto while storing potential energy in the flexible portion (17) connected thereto to obtain the assembled state of the box casing (1) with the respective second plate part (16b) extending substantially perpendicularly or perpendicularly to the first plate part (16a) connected thereto.

8. A box casing (1) according to claim 7, wherein said first plate parts (16a) of the corner elements (15) of the first (7) and second (8) wall members are secured on the rear casing wall (9) and the front casing wall (13), respectively.

9. A box casing (1) according to claim 7, wherein the lateral casing walls (10a-b, 14a-b) of each of the first (7) and second (8) wall members are configured to be pivotally folded away from each other and towards an outer surface of the rear (9) and front (13) casing wall, respectively, and to extend overlapping each other close to and in a plane extending substantially in parallel.

10. A box casing (1) according to claim 9, wherein the lateral casing walls (10a-b, 14a-b) of each of the first (7) and second (8) wall members are configured to form an angle of less than 10° with said outer surface in the collapsed state of the box casing (1).

11. A box casing (1) according to claim 1, wherein the first lateral casing walls (10a, 14a) of the first (7) and second (8) wall members, and the second (10b, 14b) lateral casing walls of the first (7) and second (8) wall members, respectively, are configured to overlap each other over at least 50% of the longitudinal extension of each lateral casing wall (10a-b, 14a-b), in the assembled state of the box casing (1).

12. A box casing (1) according to claim 1, wherein the box casing (1) further comprises:

a top member (18) having a rectangular top surface (19) and further provided with a frame structure enclosing the top surface (19) on each side thereof by vertical front (20), rear, and first (21) and second lateral frame walls at front, rear, and first and second lateral edges of the top member (18), respectively, to provide the top member (18) with a tray shape, the top member (18) being configured to close a loading space (22) of the box casing (1), defined by the loading surface (3) of the bottom member (2) and the casing walls (9, 10*a-b*, 13, 14*a-b*) of the first (7) and second (8) wall members, by the top surface (19) with the frame walls (20, 21) extending down past upper edges of the casing walls (9, 10*a-b*, 3, 14*a-b*) along the outside thereof in the assembled state of the box casing (1).

13. A box casing (1) according to claim 1, wherein the first lateral casing wall (10*a*) of the first wall member (7) is provided with locking means configured to engage with associated locking means on the first lateral casing wall (14*a*) of the second wall member (8) to fixedly interlock the first lateral casing walls (10*a*, 14*a*) in the assembled state of the box casing (1), and the second lateral casing wall (10*b*) of the first wall member (7) is provided with locking means configured to engage with associated locking means on the second lateral casing wall (14*b*) of the second wall member (8) to fixedly interlock the second lateral casing walls (10*b*, 14*b*) in the assembled state of the box casing (1).

14. A box casing (1) according to claim 13, wherein the locking means of the first (10*a*, 14*a*) and second (10*b*, 14*b*) lateral casing walls comprise pre-cut tabs (23*a-b*) provided on each lateral casing wall (10*a-b*, 14*a-b*), in the upper region thereof, on locations such that at least one tab (23*a*) on the first lateral casing wall (10*a*) of the first wall member (7) is aligned with at least one tab (23*b*) on the first lateral casing wall (14*a*) of the second wall member (8), and at least one tab on the second lateral casing wall (10*b*) of the first wall member (7) is aligned with at least one tab on the second lateral casing wall (14*b*) of the second wall member (8) in the assembled state of the box casing (1), the at least one tab (23*a*) on the first lateral casing wall (10*a*) of the first wall member (7) is configured to be folded together with the associated tab (23*b*) on the first lateral casing wall (14*a*) of the second wall member (8) into a loading space (22) of the box casing (1) to engage with an opening created in the first lateral casing wall (14*a*) of the second wall member (8) by folding of the at least one tab (23*b*) on this lateral casing wall (14*a*) away therefrom and thereby fixedly interlock the first lateral casing walls (10*a*, 14*a*) in the assembled state of the box casing (1), and the at least one tab on the second lateral casing wall (14*b*) of the second wall member (8) is configured to be folded together with the associated tab on the second lateral casing wall (10*b*) of the first wall member (7) into the loading space (22) of the box casing (1) to engage with an opening created in the second lateral casing wall (10*b*) of the first wall member (7) by folding of the at least one tab on this lateral casing wall (10*b*) away therefrom and thereby fixedly interlock the second lateral casing walls (10*b*, 14*b*) in the assembled state of the box casing (1).

15. A box casing (1) according to claim 1, wherein the bottom member (2) has a base surface corresponding to the upper loading surface of a pallet with standard dimensions as defined by EUR, ISO or GMA.

16. A box casing (1) according to claim 1, wherein the box casing (1) is made exclusively of biodegradable material(s).

17. A box casing (1) according to claim 1, wherein the stiff plate parts (16*a-b*) of each corner element (15) are made of a straw board material.

18. A box casing (1) according to claim 1, wherein each casing wall (9, 10*a-b*, 13, 14*a-b*) and the bottom member (2) are made of corrugated board.

19. A kit for creating a box casing (1) according to claim 1, comprising the bottom member (2), and the first (7) and second (8) wall members in the collapsed state lying on top of each other on the loading surface (3) of the bottom member (2) and inside of the frame walls (4, 5, 6*a-b*) thereof.

* * * * *